Patented Oct. 8, 1946

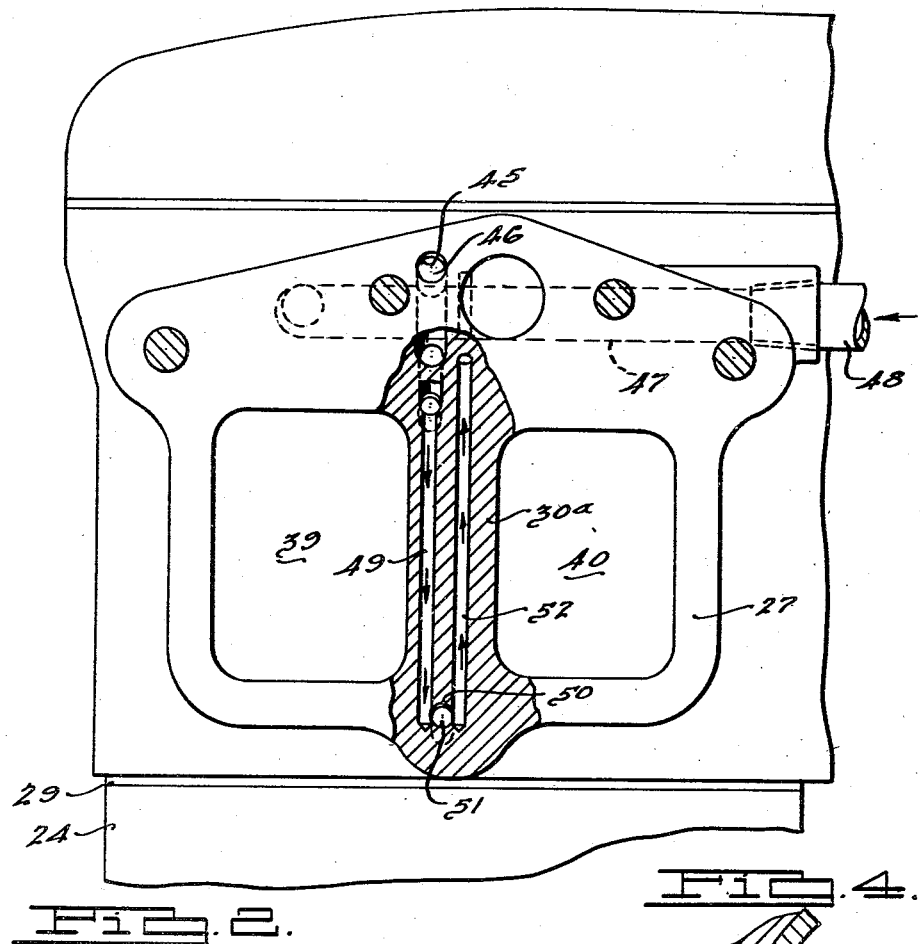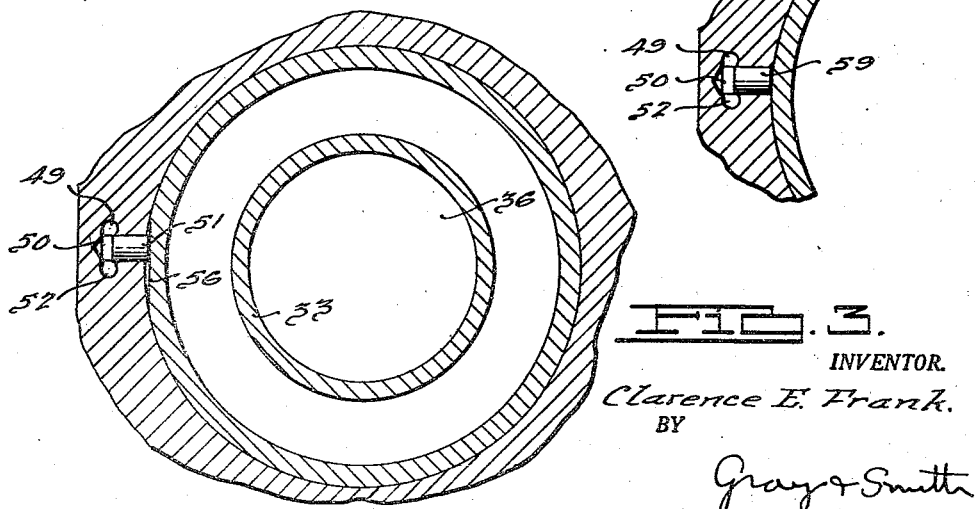

2,409,031

UNITED STATES PATENT OFFICE 2,409,031

ENGINE

Clarence E. Frank, Fraser, Mich., assignor to Briggs Manufacturing Company, Detroit, Mich., a corporation of Michigan Application March 20, 1944, Serial No. 527,222

20 Claims. (Cl. 123—80)

This invention relates to internal combustion engines and particularly to engines of the type having rotatable valves in the head thereof. The present invention has particular application to an internal combustion engine of the kind in which the rotatable valve in the head, preferably although not necessarily of the kind which rotates continuously in one direction, is formed with substantially all or at least the major portion of the combustion chamber and is generally conical or frusto-conical in shape. The combustion chamber within the rotor or rotary valve has an opening at one end leading to the cylinder and a second opening preferably at a side thereof adapted to communicate during operation with an outlet or inlet passage, or both, as the case may be, and the combustible charge within the combustion chamber is fired preferably by spark ignition.

Engines of the foregoing type present the possibility of considerable advantages, long recognized, as compared with conventional engines of the poppet valve type, such as simplification of construction, reduction in weight, and higher speed operation with consequent increase in power output. Many difficulties, however, are presented in the production of a satisfactory engine of this type, one of the most serious being in connection with the lubrication of the rotary valve and oil consumption. It is important that lubricating oil be supplied to the rotary valve and that an adequate oil film be maintained between juxtaposed rubbing surfaces of the valve and the cylinder head during operation.

One of the objects of the present invention is to provide a lubricating means for a rotatable valve of the above type of engine which will be more efficient and accurate thereby improving the operation of the engine and reducing oil consumption.

A further object of the invention is to provide a relatively simple and efficient means for delivering lubricating oil to the bearing surface of the rotary valve in metered or predetermined amounts whereby substantially exact control is maintained of the oil used to lubricate the valve and consequent elimination of excessive oil consumption is achieved.

Still a further object of the invention is to provide a conduit or passage means in the cylinder head through which lubricating oil is conveyed to the bearing surface of the rotatable valve, the outlet or port leading from the passage to the valve being partially closed by means of a plug or wiper element through or around which the oil flows to the valve bearing surface.

Another object of the invention is to provide an oil passage in the cylinder head having an outlet through the valve bearing wall in the head for delivering oil to the juxtaposed surface of the valve, the outlet being closed, or partially so, by means of a plug which is formed of porous material, such as sintered metal, through the pores of which oil is capable of flowing.

Still another object of the invention is to provide an oil passage in the head leading to the juxtaposed bearing surfaces of the rotary valve and head, the passage at a predetermined point, preferably at the locality of its outlet to said bearing surfaces being closed, or partially so, either by a plug of porous material through which oil can be forced in predetermined amounts under pressure to lubricate the valve or by a plug having a passage around or through it permitting the flow past the plug of predetermined or metered amounts of oil. In the latter instance the plug is preferably arranged in the outlet to the oil passage and free to move therein so as to prevent the outlet from becoming clogged or obstructed by the formation of carbon. It is also preferred that the plug extend into position to engage the valve surface and have a wiping action thereon.

Other objects of this invention will appear in the following description and appended claims, reference being had to the accompanying drawings forming a part of this specification wherein like reference characters designate corresponding parts in the several views.

Fig. 2 is a section taken substantially through lines 2—2 of Fig. 1 looking in the direction of the arrows.

Fig. 3 is a section taken substantially through lines 3—3 of Fig. 1 looking in the direction of the arrows.

Fig. 4 is a fragmentary sectional view, in part similar to Fig. 3, illustrating another embodiment of the invention.

Figure 1:
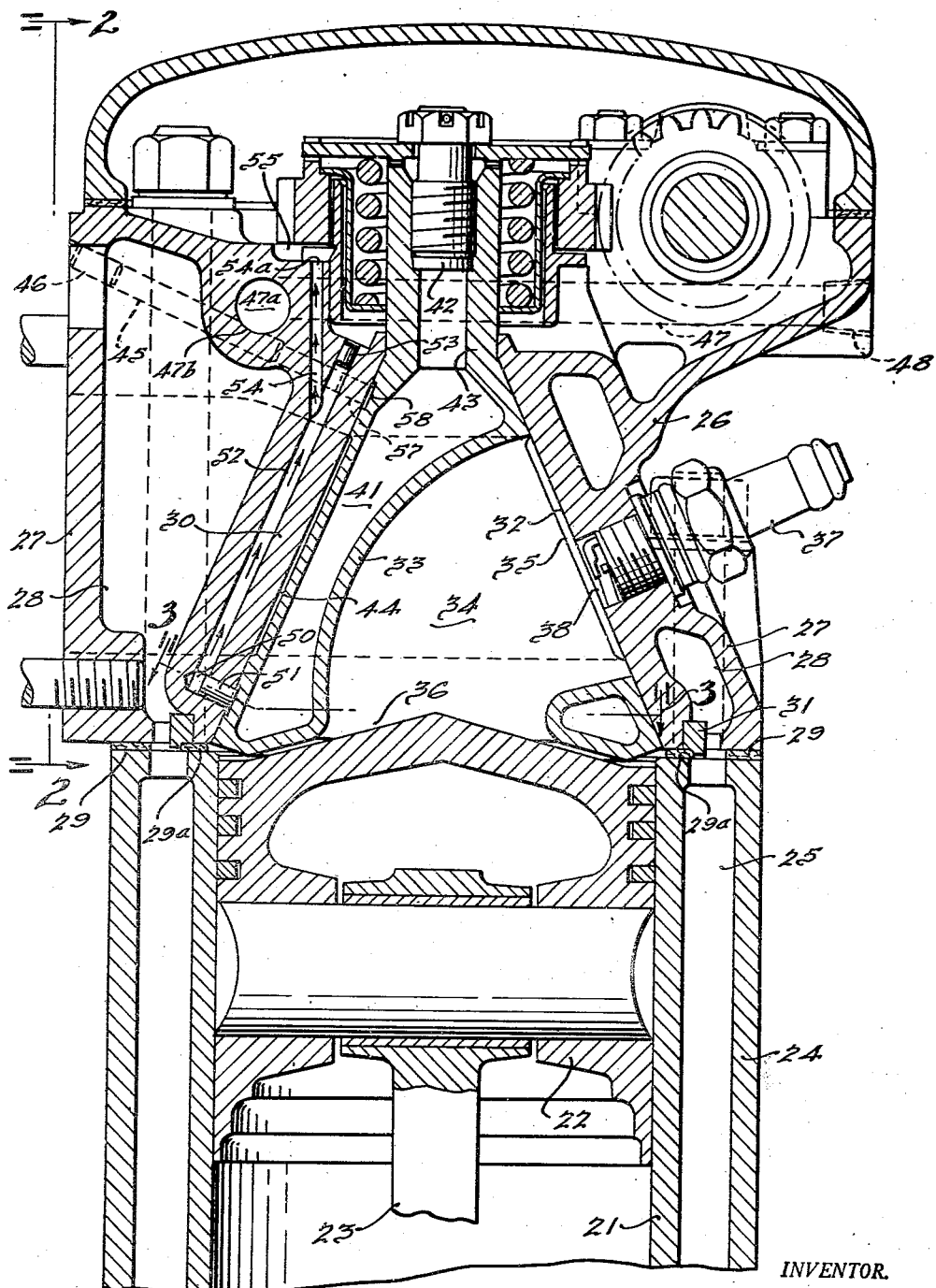
Fig. 1 is a fragmentary sectional elevation illustrating a portion of a multi-cylinder engine embodying the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there are illustrated, by way of example, several embodiments of the present invention as applied to an internal combustion engine of the spark ignition type which may be used for the power plant of an aircraft or motor vehicle or for other purposes, such as for marine and industrial engines. For most uses the engine is of the multi-cylinder type, although any number of cylinder units may be employed in any given engine. In the present embodiments, for the purposes of simplicity, a single cylinder unit of the engine is illustrated, it being understood that the remaining cylinders of the engine are substantially identical to the structure herein shown and described.

Referring to Fig. 1, the present engine comprises a suitable crankcase (not shown) carrying a cylinder 21 within which a piston 22 is mounted for reciprocation. A crankshaft (not shown) is supported in suitable bearings in the crankcase according to conventional practice and the piston is connected to the crankshaft by a connecting rod 23.

The present engine, for the purposes of illustration, is of the liquid cooled type and, accordingly, the cylinder 21 is mounted within a cylinder jacket 24 the lower end of which is secured to the crankcase. Between the cylinder jacket 24 and the cylinder is a liquid coolant chamber 25. The engine also comprises a cylinder head 26 which is bolted down onto the upper end of the cylinder. The cylinder head is cast to provide a depending cylinder head jacket 27 forming a liquid coolant chamber 28 communicating with the chamber 25. Interposed between the cylinder head and cylinder jacket 24 is a sealing ring 29 which is held under compression to provide a liquid tight seal against the leakage of the coolant from the communicating chambers 25 and 28. A second sealing ring or gasket 29a is interposed between the cylinder head and the upper edge of the cylinder 21, this gasket being placed under compression when the cylinder head is bolted down onto the cylinder so as to provide a gas and liquid tight cylinder.

The cylinder head 26 is formed with a valve housing 30, largely surrounded by the coolant chamber 28. The lower or inner edge of the valve housing portion of the cylinder head is formed with an annular groove or recess to receive an expansion control ring 31. This ring is adapted to restrain or control the expansion of the adjacent wall portion of the cylinder head valve housing 30 and is preferably formed of a metal or metal alloy selected so that by virtue of its differential expansion rate the adjacent portion of the valve housing 30 will expand at substantially the same rate as the adjacent portion of the rotary valve operating within the valve housing. This construction embodying the expansion control ring 31 and the function thereof are more fully shown and described in a copending application Serial No. 517,381, filed January 7, 1944.

The valve housing portion 30 of the cylinder head is provided with a generally frusto-conical cavity 32 within which is rotatably mounted a generally frusto-conical valve 33, it being understood that the outer tapering wall of the valve corresponds generally to the shape of the juxtaposed wall of the cavity 32. The valve 33 is provided with a combustion chamber 34 having a bottom port 36 arranged in constant communication with the cylinder and a side port 35 adapted to register in succession, during rotation of the valve, with a spark plug 37 at the spark plug location 38, an exhaust conduit 40 in the cylinder head, and an intake conduit 39 also in the cylinder head.

The piston 22 is preferably formed at its outer end with a tapered portion which projects into the combustion chamber 34 as a result of which substantially the entire combustion space, at the time of firing, is formed within the valve. In the present embodiment, in which the valve 33 has a single port 35 in its side adapted to register in succession with the spark plug, exhaust conduit and intake conduit, the valve is rotated at one-half engine or crankshaft speed. The body of the rotary valve 33 is cored entirely around the combustion chamber 34 to provide a cooling chamber 41 containing any suitable heat transfer or conducting medium, such as metallic sodium. This chamber is sealed at its upper end by means of an expansion plug or disk 42 mounted within a bore in the projecting stem 43 of the valve.

As illustrated in Fig. 1, the outer wall of the valve 33 is relieved circumferentially at 44. This relief area preferably extends substantially entirely around the valve in the height of the side port 35. In the illustrated embodiment the height of this circumferential relief area 44 corresponds substantially to the height of the side port 35. Although this relieved area in the present instance is formed entirely in the surface of the valve, it will be understood that it may be formed partially in the valve and partially in the surface of the cavity 32 of the valve housing 30, or entirely in the latter. The relieved area 44 may, therefore, be constructed and serve the purposes in accordance with copending application Serial No. 495,260, filed July 19, 1943.

In accordance with the present invention means is provided for lubricating the bearing surfaces of the valve 33 and the valve housing 30 above and below the side port 35 and the annular relief area 44 in the valve. The cylinder head is drilled to provide an oil passage 45 the outer end of which is plugged at 46. The cylinder head is also formed with an oil passage or conduit 47 connected to a pipe or tube 48 through which lubricating oil is introduced into the passage 47 under pressure. The oil inlet passage 47 communicates with a branch passage 47a which intersects or cuts at 47b across the oil passage 45 whereby lubricating oil flowing under pressure through passages 47 and 47a will enter the passage 45. As illustrated in Fig. 2, the oil passage 45 communicates with a duct or drilled passage 49 in the valve housing 30, this passage extending substantially parallel to the wall 32 of the valve housing. The lower end of the oil passage 49 intersects one side of a hole 50 drilled at right angles thereto and extending into the valve cavity near the lower end of the valve 33 at a point below the relief area 44 but above the lower edge of the valve.

Within the cylindrical hole 50 is mounted a cylindrical plug 51 which, in the embodiment shown in Fig. 3, has a sliding fit within the hole 50. A second duct or oil passage 52 is drilled in the valve housing 30 parallel to the passage 49 and intersecting the hole 50 at the side thereof opposite to the passage 49. From this construction, as particularly shown in Figs. 2 and 3 it will be seen that the oil passages 49 and 52 both communicate at their lower ends with the oil hole or duct 50. Thus, lubricating oil introduced under pressure from the inlet oil passage 47 into the passage 45 at orifice 47b will thence flow downwardly through the passage 49 into the oil hole or duct 50 and the pressure thereof will force the metering plug 51 outwardly toward and into contact with the surface of the valve 33. This plug may have a slightly less diameter than the hole or duct 50 so as to provide a predetermined clearance or space around the plug, or the plug may be formed with one or more longitudinal metering grooves, thereby permitting a portion of the oil flowing from passage 49 into the duct 50 to pass or seep by the plug to the bearing surface of the valve. Only a predetermined portion of the oil flowing through passage 49 will, therefore, be conveyed through the duct 50 to the valve past the plug 51, the remaining oil flowing across the inner end of the hole 50 into the return passage 52 and thence upwardly as shown by the arrows in Fig. 1. The upper end of the passage 52 is closed by a plug 53 and hence oil flowing upwardly through the passage 52 will be conveyed through a drilled passage 54 having an outlet orifice 54a into an oil reservoir 55 in the head. The customary oil overflow conduit (not shown) from the reservoir in the head to the engine crankcase is provided whence oil is returned by the usual oil pump to the line 48.

In the embodiment shown in Fig. 3 the valve is machined to provide a flattened portion 56 adapted to register with the plug 51. Thus, during every revolution of the valve the flat 56 will come opposite the plug 51 which under the pressure of the oil will be forced into the recess in the valve formed by the flat. When, however, the flat passes by the plug 51, the latter will be cammed inwardly in the hole 50. As a consequence, the plug 51 will be reciprocated axially a slight distance within the hole 50 once during every revolution of the valve. This action will keep the plug free within its hole, prevent it from freezing therein and becoming clogged or obstructed in case of the formation of carbon.

The oil passage 45, in addition to communicating with the passage 49, leads into a hole or duct 57 drilled axially of the hole or passage 45 through the wall of the valve housing 30 above the relief area 44. The duct 57 may thus be a continuation of the passage 45 and corresponds to the duct 50 adjacent the lower end of the valve. Within the hole or duct 50 is mounted a plug or insert 58 similar to the plug 51. This construction by which lubricating oil is conveyed to the valve bearing surface above the relief 44 through duct 57 past the plug 58 corresponds to the construction above described with respect to plug or insert 51 and duct 50.

Referring to the embodiment illustrated in Fig. 4, the hole or duct 50 in this instance is closed, or partially so, by means of a plug or insert 59 which may either be fixed therein or have a sliding fit within the hole. The valve in this instance is not provided with the flat 56 and the flow of oil in measured quantity past the plug 59 is accomplished by forming the plug of metal having sufficient porosity to permit the oil under pressure to ooze or seep through the pores of the plug and thence distributed over the bearing surfaces by the wiping action of the valve. The plug 59 in this embodiment may be formed, for example, of sintered metal, thus providing in effect a wick having minute oil passages through the plug. The amount of oil, which will flow or seep past the plug to the valve bearing surface during any given interval of time, can be controlled accurately and metered as desired to suit the requirements of the particular engine by varying the diameter of the plug, its porosity and the oil pressure. It will be noted that the plug extends at right angles to the surface of the valve thereby ensuring a proper feed of oil to the bearing surface. It may be free to move within the hole and during operation will be pressed against the valve by the oil pressure. Since the valve has an operating clearance in the valve cavity it will be shifted laterally at each explosion, and the sidewise impact of the valve will shift the plug outwardly in its hole. Thus, the plug will move back and forth within the hole in accordance with the lateral shifting movement of the valve within the valve cavity and as a consequence will remain free at all times. It will be understood that the construction shown in either Fig. 3 or Fig. 4 is preferably provided above and below the relief 44. Where the plugs 51 are of porous wick construction, additional metered amounts of oil may be fed past the plugs by grooving them longitudinally or varying their clearance in the oil holes so as to permit some oil to seep around and past the plugs.

The amount of oil pressure at the locality of the plugs 51 and 58 or 59 and, hence, the rate of flow of the oil past the plugs to the bearing surfaces of the valve will be determined by the relative sizes of the orifice 47b connecting the passages 47a and 45 and the orifice 54a at the outlet of the passage 52 into the oil reservoir 55. Thus, by reducing as in the present instance the size or area of the orifice 54a so as to be smaller than the orifice 47b in the passage 45, pressure will be built up at the locality of the plugs thereby causing the oil to flow past the plugs under predetermined pressure. If, however, a lesser pressure is desired at the plugs, the orifices may be made the same size and, as a consequence, there will be no oil pressure at the locality of the plugs except that due to the oil head in the reservoir. The exact pressure of oil at the plugs to produce the desired rate of flow through or around the plugs to the bearing surfaces may be readily determined and may be easily varied.

It is considered desirable in connection with the present lubricating means that the plugs or inserts be located in the cylinder head opposite the spark plug 37 so as to feed oil to the bearing surfaces at the high pressure side of the valve cavity 32. Hence, at the time of firing and during the compression stroke an adequate oil film will be assured at the bearing surfaces under greatest load or pressure.

In the present embodiment the valve or rotor is driven at one-half engine or crankshaft speed through the medium of mechanism connected to the projecting stem of the valve. In addition, the valve is yieldingly held upwardly within the frusto-conical cavity in the valve housing through the medium of a compression spring which is maintained under constant compression. This construction as well as the valve driving mechanism is illustrated in Fig. 1 and corresponds substantially to that shown and described in my copending application Serial No. 515,479, filed December 24, 1943.

I claim:

1. In an internal combustion engine having a cylinder, a cylinder head, a rotatable valve in said head associated with the cylinder, an oil inlet conduit in said cylinder head communicating with a bearing surface of the valve for delivering oil thereto, and a porous plug element in said conduit contacting said valve and restricting the flow of oil to said bearing surface, and constructed to permit flow of the oil through the pores thereof.

2. In an internal combustion engine having a cylinder, a cylinder head, a rotatable valve in said head associated with the cylinder, an oil inlet conduit in said cylinder head communicating with a bearing surface of the valve for delivering oil thereto, and a cylindrical plug element in said conduit engageable with the valve and restricting the flow of oil to said bearing surface while permitting the flow of oil past the plug element in all positions of the element.

3. In an internal combustion engine having a cylinder, a cylinder head, a rotatable valve in said head associated with the cylinder, an oil inlet conduit in said cylinder head communicating with a bearing surface of the valve for delivering oil thereto, and a porous metal plug element in said conduit at the locality of its outlet to said bearing surface and engaging the latter, said element being constructed to permit the flow of oil through the pores thereof.

4. In an internal combustion engine having a cylinder, a cylinder head, a rotatable valve in said head associated with the cylinder, an oil inlet conduit in said cylinder head communicating with a bearing surface of the valve for delivering oil thereto, and a porous metal plug element in said conduit at the locality of its outlet to said bearing surface and engaging the latter, said element being constructed to permit the flow of oil through the pores thereof and having wiping contact with the valve.

5. In an internal combustion engine having a cylinder, a body, a rotatable valve in said body provided with a combustion chamber, said valve and body having cooperating bearing surfaces, an oil inlet conduit in the head leading to said bearing surfaces, a shiftable plug element in said conduit adjacent said bearing surfaces, said plug element having passages restricting but not preventing the flow of oil to said surfaces, and said valve being engageable with said element for shifting the same in the conduit upon rotation of the valve.

6. In an internal combustion engine having a cylinder, a body, a rotatable generally frusto-conical valve in said body provided with a combustion chamber, said valve and body having cooperating generally frusto-conical bearing surfaces, an oil inlet conduit in the head leading to said bearing surfaces, and a shiftable plug element in said conduit adjacent said bearing surfaces, said plug element restricting but not preventing the flow of oil to said surfaces and having wiping contact with the valve.

7. In an internal combustion engine having a cylinder, a cylinder head, a rotatable generally frusto-conical valve having side wall bearing engagement with a tapering bearing surface in the head, said valve having a combustion chamber communicating with the cylinder, an oil conduit in the head having an inlet and an outlet, a duct communicating with said conduit at a point intermediate said inlet and outlet and opening through said bearing surface, and means in said duct for restricting the flow of oil to said surface.

8. In an internal combustion engine having a cylinder, a cylinder head, a rotatable generally frusto-conical valve having side wall bearing engagement with a tapering bearing surface in the head, said valve having a combustion chamber communicating with the cylinder, an oil conduit in the head having an inlet and an outlet, a duct communicating with said conduit at a point intermediate said inlet and outlet and opening through said bearing surface, and means including a porous plug element in said duct for restricting the flow of oil to said surface.

9. In an internal combustion engine having a cylinder, a cylinder head, a rotatable generally frusto-conical valve having side wall bearing engagement with a tapering bearing surface in the head, said valve having a combustion chamber communicating with the cylinder, an oil conduit in the head having an inlet and an outlet, a duct communicating with said conduit at a point intermediate said inlet and outlet and opening through said bearing surface, and a fixed plug element in said duct for restricting the flow of oil to said surface.

10. In an internal combustion engine having a cylinder, a cylinder head, a rotatable generally frusto-conical valve having side wall bearing engagement with a tapering bearing surface in the head, said valve having a combustion chamber communicating with the cylinder, an oil conduit in the head having an inlet and an outlet, a duct communicating with said conduit at a point intermediate said inlet and outlet and opening through said bearing surface, and a movable plug element in said duct for restricting the flow of oil to said surface and adapted to contact said valve.

11. In an internal combustion engine having a cylinder, a cylinder head, a rotatable valve in said head associated with the cylinder, an oil inlet conduit in said cylinder head having an inlet and an outlet and a portion therebetween communicating with a bearing surface of the valve for delivering oil thereto, and a plug element in said portion forming with the walls thereof restricted passages for the uninterrupted flow of oil to said bearing surface.

12. In an internal combustion engine having a cylinder, a cylinder head, a rotatable valve in said head associated with the cylinder, an oil inlet conduit in said cylinder head communicating with a bearing surface of the valve for delivering oil thereto, a plug element in said conduit at the locality of said bearing surface, said element restricting but not preventing the passage of oil past the plug to said bearing surface, and an oil outlet conduit in said head leading from said plug element.

13. In an internal combustion engine having a cylinder, a body, a rotatable valve in said body provided with a combustion chamber, said valve and body having cooperating bearing surfaces, an oil conduit in the head having an inlet and an outlet and an intermediate portion leading to said bearing surfaces, and a fixed plug element in said portion adjacent said bearing surfaces, said plug element restricting but not preventing the flow of oil to said surfaces.

14. In an internal combustion engine having a cylinder, a body, a rotatable valve in said body provided with a combustion chamber, said valve and body having cooperating bearing surfaces, an oil inlet conduit in the head leading to said bearing surfaces, a fixed porous plug element in said conduit adjacent said bearing surfaces, said plug element restricting but not preventing the flow of oil to said surfaces, and an oil outlet conduit in said head leading from said plug element.

15. In an internal combustion engine having a cylinder, a body, a rotatable valve in said body provided with a combustion chamber, said valve and body having cooperating bearing surfaces, an oil inlet conduit in the head leading to said bearing surfaces, a shiftable plug element in said conduit adjacent said bearing surfaces, said plug element restricting but not preventing the flow of oil to said surfaces in any position of the element, and an oil outlet conduit in said head leading from said plug element.

16. In an internal combustion engine having a cylinder, a cylinder head, a rotatable valve having side wall bearing engagement with a bearing surface in the head, an oil inlet conduit in the head, an oil duct in communication with said conduit and opening through said bearing surface, means in said duct having a multiplicity of passages for permitting uninterrupted flow of oil to said surface, and an oil outlet conduit in said head leading from said duct.

17. In an internal combustion engine having a cylinder, a cylinder head, a rotatable valve having side wall bearing engagement with a bearing surface in the head, an oil inlet conduit in the head, an oil duct in communication with said conduit and opening through said bearing surface, means in said duct permeable to the passage of oil therethrough for controlling the flow of oil to said surface, and an oil outlet conduit in said head leading from said duct.

18. In an internal combustion engine having a cylinder, a valve supporting body associated with the cylinder, a rotatable valve in said body, an oil passage in said body leading to the valve, porous means for restricting the flow of oil through said passage to the valve, and means for conveying oil to and from said passage.

19. In an internal combustion engine having a cylinder, a valve supporting body associated with the cylinder, a rotatable valve in said body, an oil duct in said body leading to the valve, means in said duct constructed with a number of passages permitting a continuous but restricted flow of oil through said duct to the valve, and means for conveying oil to and from said duct.

20. In an internal combustion engine having a cylinder, a valve supporting body associated with the cylinder, a rotatable valve in said body, an oil duct in said body leading to the valve, a cylindrical plug element slidable in said duct and contacting said valve, said plug forming with the walls of said duct restricted passages for the uninterrupted flow of oil to the valve, and means for conveying oil to and from said duct.

CLARENCE E. FRANK.